(12) United States Patent
Lee et al.

(10) Patent No.: US 7,463,773 B2
(45) Date of Patent: Dec. 9, 2008

(54) FAST HIGH PRECISION MATCHING METHOD

(75) Inventors: Shih-Jong J. Lee, Bellevue, WA (US); Seho Oh, Bellevue, WA (US)

(73) Assignee: DRVision Technologies LLC, Bellevue, WA (US)

( * ) Notice: Subject to any disclaimer, the term of this patent is extended or adjusted under 35 U.S.C. 154(b) by 745 days.

(21) Appl. No.: 10/723,397

(22) Filed: Nov. 26, 2003

(65) Prior Publication Data

US 2005/0114332 A1    May 26, 2005

(51) Int. Cl.
- G06K 9/68 (2006.01)
- G06K 9/62 (2006.01)
- G06K 9/00 (2006.01)

(52) U.S. Cl. ............... 382/218; 382/209; 382/181; 382/291; 382/195; 382/296; 382/217; 382/117; 382/224; 382/135; 382/219; 382/159; 382/190; 382/165; 382/151; 382/287; 706/20; 706/25; 706/27; 707/3; 358/1.9

(58) Field of Classification Search ......... 382/218, 382/151, 209, 217, 291, 195, 296, 117, 224, 382/135, 219, 190, 165, 287, 278, 181; 707/6, 707/3; 706/20, 25, 27
See application file for complete search history.

(56) References Cited

U.S. PATENT DOCUMENTS

| | | | | |
|---|---|---|---|---|
| 4,567,610 A | * | 1/1986 | McConnell | 382/170 |
| 4,972,499 A | * | 11/1990 | Kurosawa | 382/227 |
| 5,982,912 A | * | 11/1999 | Fukui et al. | 382/118 |
| 6,088,483 A | * | 7/2000 | Nakano et al. | 382/209 |
| 6,272,247 B1 | * | 8/2001 | Manickam et al. | 382/217 |
| 6,603,882 B2 | * | 8/2003 | Oh et al. | 382/217 |
| 6,640,008 B1 | * | 10/2003 | Lee et al. | 382/218 |
| 6,789,925 B1 | * | 9/2004 | DeGregorio | 362/473 |

(Continued)

OTHER PUBLICATIONS

Manickam, Swami, Roth, Scott D., Bushman, Thomas, "Intelligent and Optimal Normalized correlation for High-Speed Pattern Matching", NEPCON West 2000.

(Continued)

Primary Examiner—Samir A Ahmed
Assistant Examiner—Nancy Bitar

(57) ABSTRACT

An initial search method uses the input image and the template to create an initial search result output. A high precision match uses the initial search result, the input image, and the template to create a high precision match result output. The high precision match method estimates high precision parameters by image interpolation and interpolation parameter optimization. The method also performs robust matching by limiting pixel contribution or pixel weighting. An invariant high precision match method estimates subpixel position and sub-sampling scale and rotation parameters by image interpolation and interpolation parameter optimization on the log-converted radial-angular transformation domain.

6 Claims, 4 Drawing Sheets

U.S. PATENT DOCUMENTS

| | | | |
|---|---|---|---|
| 6,798,925 B1 * | 9/2004 | Wagman | 382/287 |
| 6,859,550 B2 * | 2/2005 | Oh et al. | 382/155 |
| 6,944,331 B2 * | 9/2005 | Schmidt et al. | 382/165 |
| 7,039,229 B2 * | 5/2006 | Lin et al. | 382/165 |
| 7,054,492 B2 * | 5/2006 | Lee et al. | 382/216 |
| 7,110,603 B2 * | 9/2006 | Lee et al. | 382/209 |
| 7,139,764 B2 * | 11/2006 | Lee | 707/100 |
| 7,142,718 B2 * | 11/2006 | Lee et al. | 382/209 |
| 7,164,796 B1 * | 1/2007 | Silver et al. | 382/209 |
| 2003/0086616 A1 * | 5/2003 | Oh et al. | 382/209 |
| 2006/0147105 A1 * | 7/2006 | Lee et al. | 382/151 |

OTHER PUBLICATIONS

Gleason, S.S., M.A. Hunt, and W. B. Jatko, "Subpixel Measurement of Image Features Based on Paraboloid Surface fit", SPIE vol. 1386. Machine Vision Systems Integration in Industry. 1990.

Frischchlz Robert W. and Spinnler, Klaus P. "Class of algorithms for real-time subpixel registration" Proc. SPIE vol. 1989, p. 50-59, Computer Vision for Industry, Donald W. Braggins; Ed.

* cited by examiner

FAST HIGH PRECISION MATCHING METHOD

TECHNICAL FIELD

This invention relates to a method for fast high precision matching.

BACKGROUND OF THE INVENTION

Pattern search is a simple yet powerful machine vision tool. Given a template pattern and an image, its objective is to find all instances of the patterns in the image. It involves two steps, a search step and a matching step. The search step places the pattern at all valid poses (locations, rotation angles, sizes) of the image being searched. The matching step determines the goodness of the match between the pattern at a given pose and the subset of the image corresponding to the pose. For advanced applications, it is desirable that the matching step produces high precision (that is, subpixel position, subsampling scale and rotation) results.

Normalized correlation method (Manickam, Swami, Roth, Scott D., Bushman, Thomas, "Intelligent and Optimal Normalized correlation for High-Speed Pattern Matching", NEPCON WEST 2000, February 2000) of fixed rotation and scale has been widely used as the matching method in many machine vision applications. The match score of normalized correlation is largely independent of linear variations in object shading caused by reflectivity or illumination variations.

A rotation and scale invariant pattern matching method was disclosed (Rotation and Scale Invariant Pattern Matching Method, U.S. Pat. No. 6,640,008) that generates a polar coordinate representation of the pattern template image that allows for fast linear search of scale along the radius axis and rotation along the angular axis. A fast regular shaped pattern search method was disclosed (Fast Regular Shaped Pattern Searching, U.S. patent application Ser. No. 10/255,016) that performs fast pattern matching with flexible projection kernels to construct regular-shaped patterns using an accumulation method. A fast invariant searching method was disclosed (Fast Invariant Pattern Search, U.S. patent application Ser. No. 10/302,466). It generates rotation and scale invariant profiles for fast invariant search using the fast regular shaped pattern construction method. In addition, a fast pattern searching method was disclosed (Fast Pattern Searching, U.S. patent application Ser. No. 10/283,380) that performs fast scale and aspect ratio invariant search.

The above prior art approaches are not designed for highly precise sub-pixel and sub-sampling matching. They return the discrete pixel position that yields the best match and the coarse rotation and scale estimate. A surface fitting approach (Gleason, S. S., M. A. Hunt, and W. B. Jatko, "Subpixel Measurement of Image Features Based on Paraboloid Surface fit", SPEE Vol. 1386. Machine Vision Systems Integration in Industry, 1990) is attempted for subpixel matching. This approach fits the surface of the template matching scores (such as normalized correlation values) and estimates the maximum position from the surface for subpixel matching results. The fitting method suffers from the underlying non-linear matching functions whose scores cannot be well characterized by the fitting surfaces. This, therefore, could yield misleading subpixel (for shift) or subsampling (for rotation and/or scale) matching results. It is reported that the error of the template matching score fitting based method is about 13% (Frischchlz Robert W. and Spinnler, Klaus P. "Class of algorithms for real-time subpixel registration" Proc. SPIE Vol. 1989, p. 50-59, Computer Vision for Industry, Donald W. Braggins; Ed).

A more accurate approach is to perform subpixel and subsampling interpolation in the image domain. Then, template matching is performed on the interpolated higher resolution image. This could yield more accurate results than performing interpolation on the matching score surface. Depending on the interpolation method, system noise and the number of bits per pixel used to quantized the data, it is expected that a midrange error of 0.01 to 0.05 pixel could be achieved using this method (Frischchlz Robert W. and Spinnler, Klaus P. "Class of algorithms for real-time subpixel registration" Proc. SPIE Vol. 1989, p. 50-59, Computer Vision for Industry, Donald W. Braggins; Ed). However, interpolation on the image domain for high precision matching requires large data volume and matching computation, which is too expensive for deployment in practical applications.

A prior art approach ("Golden template comparison for rotated and/or scaled images" U.S. Pat. No. 5,850,466) stores, in an array, a varied plurality of golden template images, each golden template image being characterized by a different combination of rotation and/or scale and/or sub-pixel translation. The array is indexed by the respective quantized rotation and/or quantized scale and/or sub-pixel translation of each version of the golden template image. This approach still requires a large number of template storage and computational cost for matching at high precision. So it is still impractical.

OBJECTS AND ADVANTAGES

This invention provides a fast method for high precision matching with the equivalent subpixel and subsampling interpolation in the image or template domain without actual performing the subpixel interpolation and/or subsampling. It achieves the high precision through sampling parameter optimization. Therefore, very fine sampling precision can be accomplished without the difficulty of high resolution image/template storage and expensive computation for actual matching at high resolution.

This invention includes a robust high precision matching method that allows the matching of noisy or imperfect data by limiting the contribution from each pixel and/or weighting the pixels by their significance/reliability, etc. The speed advantage is applicable to the robust matching methods of this invention.

This invention is generalized to include the high precision scale and rotation invariant matching through parameter optimization on log-converted radial-angular coordinate. This invention can be easily generalized to three-dimensional or higher dimensional invariant high precision pattern search and can achieve even greater speed advantage comparing to the prior art methods. Therefore, it can be used in applications such as 3D medical imaging, dynamic medical imaging, confocal microscopy, live cell assays in drug discovery, or ultrasound imaging.

A further objective of this invention is to allow the software implementation of the fast high precision matching method in a general computer platform without any special hardware to reduce cost and system complexity.

SUMMARY OF THE INVENTION

A fast high precision matching method receives an input image and a template. An initial search method uses the input image and the template to create an initial search result output. A high precision match uses the initial search result, the input image, and the template to create a high precision match result output. The high precision match method estimates high precision parameters by image interpolation and interpolation parameter optimization. The high precision match method also performs robust matching by limiting pixel contribution or pixel weighting. An invariant high precision match method estimates subpixel position and subsampling scale and rotation parameters by image interpolation and interpolation parameter optimization on the log-converted radial-angular transformation domain.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which.

DETAILED DESCRIPTION OF THE INVENTION

I. Application Scenarios

A high precision matching produces highly precise results such as subpixel matching positions, high precision angles, scales, and/or focus positions. The processing flow of a fast high precision matching application scenario of this invention is shown in FIG. 1.

Figure 1:
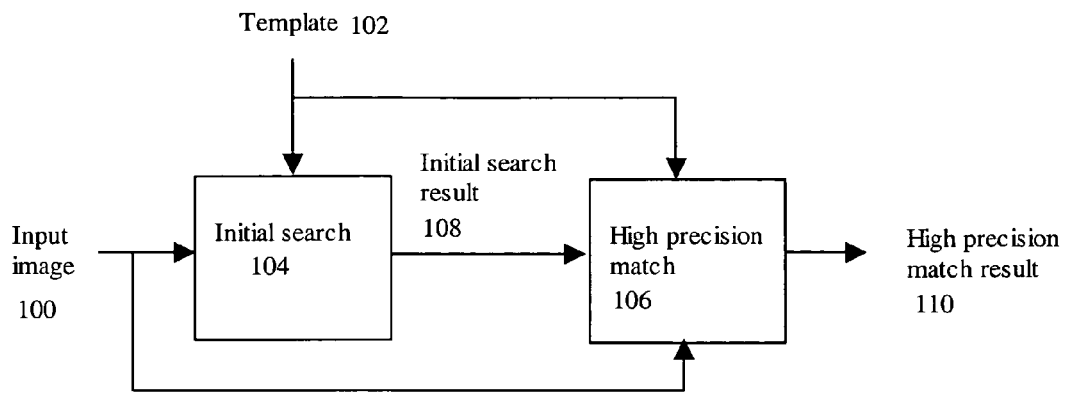
FIG. 1 shows the processing flow for the fast high precision matching method.

As shown in FIG. 1, the input image 100 and the template 102 are processed by an initial search 104 step. This results in an initial search result 108 output. The initial search 104 method searches through a large volume of data to identify the initial locations, scale, and angles that correspond to the match candidates. The initial match is fast but results are often not precise. In one embodiment of the invention, a "Fast Pattern Searching", U.S. patent application Ser. No. 10/283,380 and a "Fast Invariant Pattern Search", U.S. patent application Ser. No. 10/302,466 is used for initial search. Those skilled in the art should recognize that other methods such as standard normalized correlation method or geometric pattern matching method could be used for initial search. The initial search results are refined by the high precision match 106 step to create a high precision match result 110 output having subpixel matching positions, high precision angles, scales, and/or focus positions.

The initial search includes non-invariant and invariant searches. Similarly, the high precision match includes non-invariant and invariant high precision matches. Non-invariant search and match methods search and match template position(s) from an input image 100. The invariant search and match methods search and match template 102 and input image position subject to rotation, scale, and other variations such as focus changes, etc.

II. Non-Invariant High Precision Match

The non-invariant high precision match method produces sub-pixel matching results. In one embodiment of the invention, the basic formula of the non-invariant high precision match is described in the following section.

II.1. Matching Function

The typical matching operation is based on the normalized correlation method. The normalized correlation based matching function between two images I and J, Mat(I,J), can be described by the following formula:

$$Mat(I, J) = \frac{COV(I, J)}{\sqrt{VAR(I)VAR(J)}}$$

Where COV(I,J) is the covariance between images I and J and is described by the following formula $$COV(I, J) = \frac{1}{N}\sum_{x,y} I[x][y]J[x][y] - \left(\frac{1}{N}\sum_{x,y} I[x][y]\right)\left(\frac{1}{N}\sum_{x,y} J[x][y]\right)$$

and the variance of image I, VAR(I) is described as $$VAR(I) = \frac{1}{N}\sum_{x,y} I[x][y]I[x][y] - \left(\frac{1}{N}\sum_{x,y} I[x][y]\right)\left(\frac{1}{N}\sum_{x,y} I[x][y]\right).$$

The image region area N is described as $$N = \sum_{x,y} 1.$$

The variance of image J, VAR(J) can be similarly defined.

II.2. High Precision by Image Interpolation

The high precision is achieved by image interpolation. In one embodiment of the invention, the image interpolation is performed by linear interpolation. As an example, we describe bilinear interpolation between four pixels in this section.

Let the interpolated image of input image I be $K_{\alpha\beta}$. Where $\alpha$ and $\beta$ ($0 \leq \alpha, \beta < 1$) are subpixel values in x and y dimensions. In the bilinear interpolation method, the pixel value of the interpolated image is described by the following formula:

$K_{\alpha\beta}[x][y] = (1-\alpha)(1-\beta)I[x][y] + \alpha(1-\beta)I[x+1][y] + \beta(1-\alpha)I[x][y+1] + \alpha\beta I[x+1][y+1]$ Those skilled of art should recognize that any linear interpolation method such as weighted linear interpolation could be used in the invention for high precision matching. Furthermore, the interpolation could include more than 4 pixels.

The covariance of the $K_{\alpha\beta}$ and J can be written as $$COV(K_{\alpha\beta}, J) = \sum_{x,y} K_{\alpha\beta}[x][y]J[x][y] - \left(\sum_{x,y} K_{\alpha\beta}[x][y]\right)\left(\sum_{x,y} J[x][y]\right)$$
$$= (1-\alpha)(1-\beta)COV(I_{00}, J) + \alpha(1-\beta)COV(I_{10}, J) +$$
$$\beta(1-\alpha)COV(I_{01}, J) + \alpha\beta COV(I_{11}, J)$$

Where $$COV(I_{lm}, J) = \frac{1}{N}\sum_{x,y} I[x+l][y+m]J[x][y] -$$
$$\left(\frac{1}{N}\sum_{x,y} I[x+l][y+m]\right)\left(\frac{1}{N}\sum_{x,y} J[x][y]\right)$$

for $l, m = 0, 1$.

The variance of the $K_{\alpha\beta}$ and J can be written as $$VAR(K_{\alpha\beta}) = \sum_{x,y} K_{\alpha\beta}[x][y]K_{\alpha\beta}[x][y] - \left(\sum_{x,y} K_{\alpha\beta}[x][y]\right)\left(\sum_{x,y} K_{\alpha\beta}[x][y]\right)$$
$$= (1-\alpha)^2(1-\beta)^2 VAR(I_{00}) + \alpha^2(1-\beta)^2 VAR(I_{10}) +$$
$$\beta^2(1-\alpha)^2 COV(I_{01}) + \alpha^2\beta^2 COV(I_{11}) +$$
$$2\alpha(1-\alpha)(1-\beta)^2 COV(I_{00}, I_{10}) +$$
$$2\beta(1-\beta)(1-\alpha)^2 COV(I_{00}, I_{01}) +$$
$$2\alpha\beta(1-\alpha)(1-\beta)[COV(I_{00}, I_{11}) + COV(I_{10}, I_{01})] +$$
$$2\alpha^2\beta(1-\beta)COV(I_{10}, I_{11}) + 2\alpha\beta^2(1-\alpha)COV(I_{01}, I_{11})$$

Where $$COV(I_{lm}, I_{qr}) = \frac{1}{N}\sum_{x,y} I[x+l][y+m]I[x+q][y+r] -$$
$$\left(\frac{1}{N}\sum_{x,y} I[x+l][y+m]\right)\left(\frac{1}{N}\sum_{x,y} I[x+q][y+r]\right)$$

for $q, r = 0$ and 1. And $$VAR(I_{lm}) = \frac{1}{N}\sum_{x,y} I[x+l][y+m]I[x+l][y+m] -$$
$$\left(\frac{1}{N}\sum_{x,y} I[x+l][y+m]\right)\left(\frac{1}{N}\sum_{x,y} I[x+l][y+m]\right)$$

From the above formula, the matching function Mat(I,J), can be described as a function of the subpixel values α and β.

Figure 2:
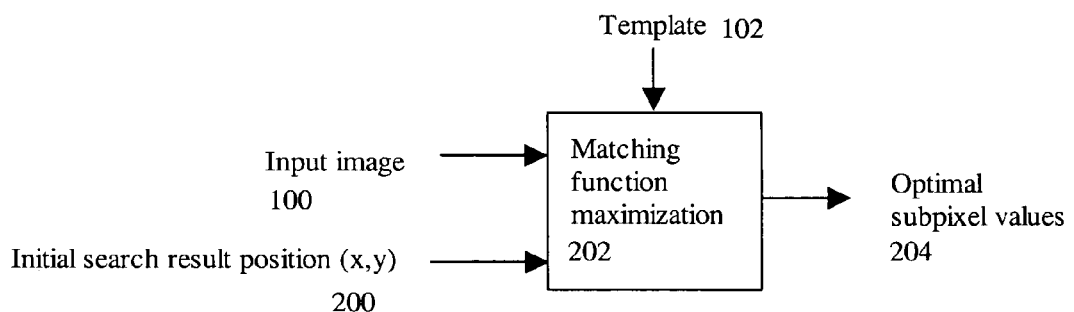
FIG. 2 shows the processing flow for the high precision match within one pixel range.

The high precision match result around a pixel position (x,y) is the subpixel values α and β correspond to the maximum value of the above matching function. When the initial search accuracy is within one pixel precision, the high precision match can be performed for the optimal subpixel values within each of the initial search result position (x,y). The processing flow of the high precision match within one pixel range is shown in FIG. 2. The input image 100 and the initial search result position (x,y) 200 are used along with the template 102 for matching function maximization 202. This results in the optimal subpixel values 204.

Those skilled in the art should recognize that multiple within one pixel range high precision matches can be used if the initial search result includes multiple candidate positions.

When the initial search result is not within one pixel precision, the high precision match can be performed for the optimal subpixel values within the pixel or the neighboring pixel of each of the initial search result position (x,y). The subpixel position whose maximum matching function is the highest among those of the pixel or the neighboring pixel is the optimal subpixel position of the high precision matching. The processing flow of the high precision match beyond one pixel range is shown in FIG. 3.

Figure 3:
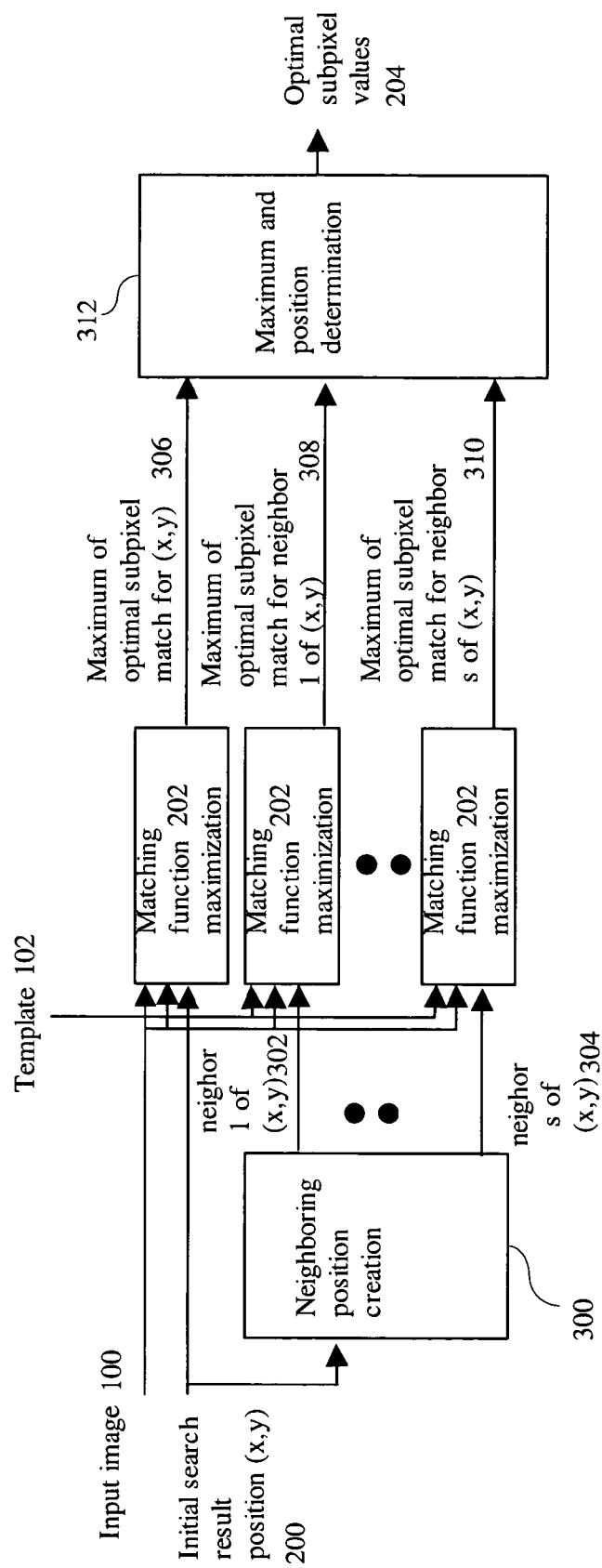
FIG. 3 shows the processing flow for the high precision match beyond one pixel range.

As shown in FIG. 3, a neighboring position creation module 300 takes the initial search result position (x,y) 200 and creates s number of neighboring positions, 302, . . . , 304. In one embodiment of the invention, the 3 by 3 adjacent neighbors of (x,y) are selected. That is, s=8. In another embodiment of the invention, the pixels immediate above, immediate below, immediate to the left, and immediate to the right of (x,y) are selected. Therefore, s=4. Those skilled in the art should recognize that other methods of neighboring position generation could be used and they are all within the scope of the current invention.

The initial search result position (x,y) 200 and its neighboring positions, 302, . . . , 304, are used to perform matching function maximization 202 for their respective within one pixel position. The maximum values for each position 306, 308, . . . , 310, are compared and the global maximum is selected by the maximum and position determination module 312. The optimal subpixel values 204 are the values correspond to the position having the highest matching function value among the initial search result position (x,y) 200 and its neighboring positions, 302, . . . , 304.

In another embodiment of the invention, the beyond one pixel range high precision matches is performed by using more than four pixels for bi-linear interpolation. For example 16 pixels could be used for interpolation.

Those skilled in the art should recognize that multiple beyond one pixel range high precision matches can be applied if the initial search result includes multiple candidate positions.

II.3. Matching Function Maximization

The matching function maximization method finds the maximum parameters that yield the maximum matching function. The matching function maximization can be performed using optimization methods such as the random optimization method, first order, second order, or quadratic fitting, etc.

To determine Mat(I,J) as a function of α and β, Mat(α,β), we rewrite $COV(K_{\alpha\beta}, J)$ and $VAR(K_{\alpha\beta})$ as:

$$COV(K_{\alpha\beta}, J) = A_1\alpha\beta + A_2\alpha + A_3\beta + A_4$$

Where
$A_1 = COV(I_{00}, J) + COV(I_{11}, J) - COV(I_{10}, J) - COV(I_{01}, J)$,
$A_2 = COV(I_{10}, J) - COV(I_{00}, J)$, $A_3 = COV(I_{01}, J) - COV(I_{00}, J)$,
$A_4 = COV(I_{00}, J)$, and $$VAR(K_{\alpha\beta}) = B_1\alpha^2\beta^2 + B_2\alpha^2\beta + B_3\alpha\beta^2 + B_4\alpha\beta + B_5\alpha^2 + B_6\beta^2 + B_7\alpha + B_8\beta + B_9$$

Where
$B_1 = VAR(I_{00}) + VAR(I_{10}) + VAR(I_{01}) + VAR(I_{11}) + 2COV(I_{00}, I_{11}) + 2COV(I_{10}, I_{01}) - 2COV(I_{00}, I_{10}) - 2COV(I_{00}, I_{01}) - 2COV(I_{10}, I_{11}) - 2COV(I_{01}, I_{11})$,
$B_2 = -2VAR(I_{00}) - 2VAR(I_{10}) + 4COV(I_{00}, I_{10}) + 2COV(I_{00}, I_{01}) - 2COV(I_{00}, I_{11}) - 2COV(I_{10}, I_{01})(I_{10}, I_{01}) + 2COV(I_{10}, I_{11})$,
$B_3 = -2VAR(I_{00}) - 2VAR(I_{01}) + 2COV(I_{00}, I_{10}) + 4COV(I_{00}, I_{01}) - 2COV(I_{00}, I_{11}) - 2COV(I_{10}, I_{01})(I_{10}, I_{01}) + 2COV(I_{01}, I_{11})$,
$B_4 = 4VAR(I_{00}) - 4COV(I_{00}, I_{10}) - 4COV(I_{00}, I_{01}) + 2COV(I_{00}, I_{11}) + 2COV(I_{10}, I_{01})$,
$B_5 = VAR(I_{00}) + VAR(I_{10}) - 2COV(I_{00}, I_{10})$, $B_6 = VAR(I_{00}) + VAR(I_{01}) - 2COV(I_{00}, I_{01})$, $B_7 = -2VAR(I_{00}) + 2COV(I_{00}, I_{10})$, $B_8 = -2VAR(I_{00}) + 2COV(I_{00}, I_{01})$, and $B_9 = VAR(I_{00})$.

The necessary condition for maximizing the matching function is $$\frac{\partial MAT(\alpha, \beta)}{\partial \alpha} = 0 \text{ and } \frac{\partial MAT(\alpha, \beta)}{\partial \beta} = 0$$

Equivalently, $$\frac{\partial M(\alpha, \beta)}{\partial \alpha} = 0 \text{ and } \frac{\partial M(\alpha, \beta)}{\partial \beta} = 0$$

Where $M(\alpha,\beta) = [MAT(\alpha,\beta)]^2$. This results in $$2VAR(K_{\alpha\beta}) \frac{\partial COV(K_{\alpha\beta}, J)}{\partial \alpha} = COV(K_{\alpha\beta}, J) \frac{\partial VAR(K_{\alpha\beta})}{\partial \alpha}$$

and $$2VAR(K_{\alpha\beta}) \frac{\partial COV(K_{\alpha\beta}, J)}{\partial \beta} = COV(K_{\alpha\beta}, J) \frac{\partial VAR(K_{\alpha\beta})}{\partial \beta}$$

From the above formula, for a given $\beta$ ($0 \leq \beta < 1$), the best $\alpha$ can be determined by the following formula:

$$\alpha = -\frac{p_3 \beta^3 + p_5 \beta^2 + p_6 \beta + p_8}{p_1 \beta^3 + p_2 \beta^2 + p_4 \beta + p_7}$$

Where
$p_1 = A_1 B_3 - 2A_3 B_1$, $p_2 = A_1 B_4 + A_2 B_3 - 2A_3 B_2 - 2A_4 B_1$,
$p_3 = 2A_1 B_6 - A_3 B_3$, $p_4 = A_1 B_7 + A_2 B_4 - 2A_3 B_5 - 2A_4 B_2$,
$p_5 = 2A_1 B_8 + 2A_2 B_6 - A_3 B_4 - A_4 B_3$, $P_6 = 2A_1 B_9 + 2A_2 B_8 - A_3 B_7 - A_4 B_4$,
$p_7 = A_2 B_7 - 2A_4 B_4$, $p_8 = 2A_2 B_9 - A_4 B_7$ Since $\alpha$ is between 0 and 1. So we set $\alpha = 0$ if the above ax calculation results in $\alpha < 0$. Similarly, we set $\alpha = 1$ if the above a calculation results in $\alpha > 1$. The formula for determining the best $\beta$ value when an a is given, can be calculated using a similar method.

Figure 4:
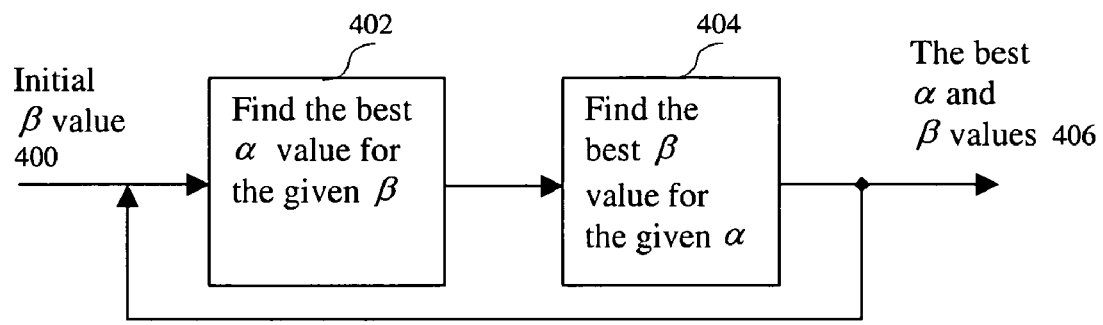
FIG. 4 shows a matching function maximization method that finds the best $\alpha$ and $\beta$ values.

In one embodiment of the invention, the matching function maximization method that finds the $\alpha$ and $\beta$ is performed by an iterative procedure as shown in FIG. 4.

As shown in FIG. 4, an initial $\beta$ value 400 is selected. The value could be randomly selected between 0 and 1 or could be a pre-determined value such as 0.5, etc. Using the initial $\beta$ value, the best a value can be found 402 by the above close form solution. The best $\alpha$ value is in term used to find the best $\beta$ value 404. The best $\beta$ value can then be applied back to the best $\alpha$ finding 402 and then best $\beta$ finding 404 processes. This process is iterated until the $\alpha$ and $\beta$ values are stable (having little change per iteration) or an exit condition such as the maximum number of iterations is reached. The resulting $\alpha$ and $\beta$ values are the best $\alpha$ and $\beta$ values 406.

Those skilled in the art should recognize that other methods of optimization could be applied to determine the optimal subpixel values.

II.4. Fast High Precision Match

The matching function, Mat(I,J), described in section II.1 matches two images I and J. If we assume that I is the input image and J is the template, then we need to calculate the variance parameters $B_1, B_2, B_3, B_4, B_5, B_6, B_7, B_8$, and $B_9$ for each candidate regions of the input image since the interpolation is performed on the input image. This could be time consuming if there are many candidate regions for matching. A fast high precision matching can be achieved by interpolating on the template. In this case, the matching function can be described as:

$$Mat(I, I_{tmp}) = \frac{COV(I, I_{tmp})}{\sqrt{VAR(I)VAR(I_{tmp})}}$$

Wherein the variance parameters $B_1, B_2, B_3, B_4, B_5, B_6, B_7, B_8$, and $B_9$ of the variance $VAR[I_{tmp}(\alpha,\beta)]$ can be pre-calculated for the fixed template. Therefore, only the covariance parameters $A_1, A_2, A_3$, and $A_4$ of the covariance term $COV[I, I_{tmp}(\alpha,\beta)]$ has to be calculated during the high precision matching process for each input region.

II.5. Fast High Precision Projection Match

Image projection is often performed in fast template search to reduce the search dimensions. A fast regular shaped pattern search method was disclosed (Fast Regular Shaped Pattern Searching, U.S. patent application Ser. No. 10/255,016) that performs fast pattern matching with flexible projection kernels to construct regular-shaped patterns using an accumulation method. The high precision match method of this invention could be applied to projected images.

The image projection profile P of an image I can be described as the summation over a given geometric region R.

$$P[x][y] = \sum_{(u,v) \in R} I[x+u][y+v]$$

We interpolate image pixel values by bilinear combination as follows:

$I_{\alpha\beta}[x][y] = (1-\alpha)(1-\beta)I[x][y] + \alpha(1-\beta)I[x+1][y] + \beta(1-\alpha)I[x][y+1] + \alpha\beta I[x+1][y+1]$ Then the projection profile values of the interpolate image pixel values are the bilinear combination of the non-interpolated projection values. That is, image interpolation first then projection is equal to image projection first and then interpolate on the projection profiles.

$$P_{\alpha\beta}[x][y] = \sum_{(u,v) \in R} I_{\alpha\beta}[x+u][y+v]$$
$$= (1-\alpha)(1-\beta)P[x][y] + \alpha(1-\beta)P[x+1][y] +$$
$$\beta(1-\alpha)P[x][y+1] + \alpha\beta P[x+1][y+1]$$

Based on this property, the above disclosed matching function optimization method could be similarly applied to achieve fast high precision match on projected image. The processing flow of the fast high precision projection match is shown in FIG. 5.

Figure 5:
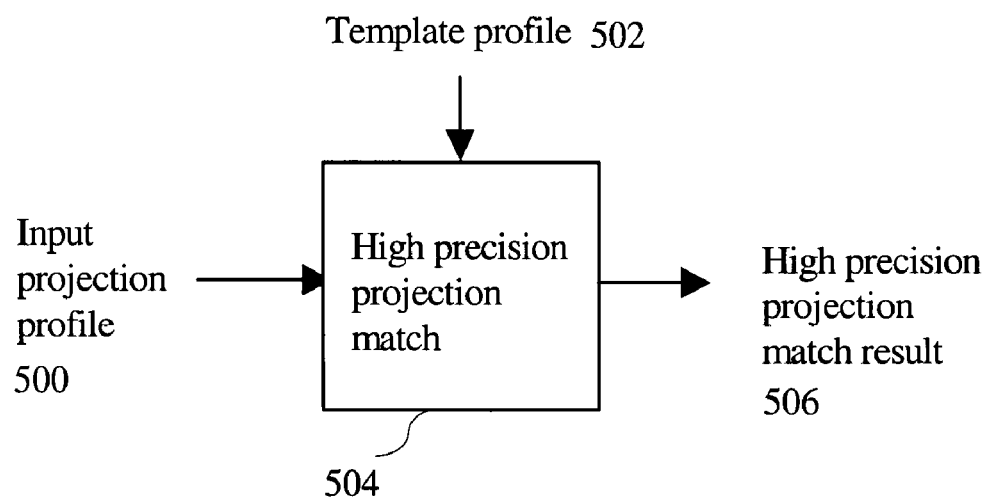
FIG. 5 shows the processing flow of the fast high precision projection match.

As shown in FIG. 5, the input projection profile 500 and the template profile 502 are subject to high precision projection match 504. The high precision projection match 504 can be performed by either interpolating the input project profile 500 or interpolating the template profile 502. The high precision match 504 process optimizes the interpolation parameters by maximizing the projection domain matching function using the same or similar methods as described above. The resulting optimal interpolation parameters are the high precision projection match result 506.

II.6. Robust Matching

In many practical applications the input image could be degraded due to noise, artifact, distortion, missing features, etc. To achieve high precision matching results, robust matching scheme may be required. Two high precision robust matching methods are provided in this invention: limiting pixel contribution and pixel weighting. The speed advantage is applicable to the high precision robust matching methods of this invention.

In one embodiment of the invention, the limiting pixel contribution method limits the contribution of each pixel to the covariance value calculation by the following rule:

$$COV(I, J) = \frac{1}{N}\sum_{x,y} \text{Min}(I[x][y]J[x][y], C_{max}) - \left(\frac{1}{N}\sum_{x,y} I[x][y]\right)\left(\frac{1}{N}\sum_{x,y} J[x][y]\right)$$

Where $C_{max}$ is the maximum allowable cross product value for a pixel.

Based on the new covariance calculation formula, the matching function, Mat(I,J), is updated and the same procedure for high precision parameter estimation applies. Therefore, the speed advantage is preserved.

In another embodiment of the invention, the robust matching is accomplished by weighing pixels with their significance/reliability. Pixels with noise, distortion, etc. are given lower weights for matching.

In this case, the variance and covariance can be calculated by the following rule:

$$COV(I, J) = \frac{1}{W_T}\sum_{x,y} W[x][y]I[x][y]J[x][y] - \left(\frac{1}{W_T}\sum_{x,y} W[x][y]I[x][y]\right)\left(\frac{1}{W_T}\sum_{x,y} W[x][y]J[x][y]\right)$$

$$VAR(I) = \frac{1}{W_T}\sum_{x,y} W[x][y]I[x][y]I[x][y] - \left(\frac{1}{W_T}\sum_{x,y} W[x][y]I[x][y]\right)\left(\frac{1}{W_T}\sum_{x,y} W[x][y]I[x][y]\right)$$

Where the total weight $$W_T = \sum_{x,y} W[x][y]$$

Based on the new variance and covariance calculation formula, the matching function, Mat(I,J), is updated and the same procedure for high precision parameter estimation applies. Therefore, the speed advantage is maintained.

In yet another embodiment of the invention, the limiting pixel contribution and the pixel weighting methods can be combined. The combined covariance calculation formula is as follows:

$$COV(I, J) = \frac{1}{W_T}\sum_{x,y} \text{Min}(W[x][y]I[x][y]J[x][y], C_{max}) - \left(\frac{1}{W_T}\sum_{x,y} W[x][y]I[x][y]\right)\left(\frac{1}{W_T}\sum_{x,y} W[x][y]J[x]\right)$$

The combined covariance can be used for fast high precision match.

III. Invariant High Precision Match

The invariant high precision match method handles scale and rotation invariant matching and produces sub-pixel position and high precision rotation angle and scale values as matching results. In one embodiment of the invention, the basic formula for the high precision scale and rotation invariant match is described in the following section.

III.1. Matching Function with Scale and Rotation Invariance

In addition to the sub-pixel matching, the scale and rotation invariant matching requires sub-sampling on scale and rotation adjustment. The scale and rotation sampling is nonlinear in regular pixel coordinate. The prior art approach performs nonlinear re-sampling to achieve scale and rotation invariance, which is time consuming and error prone.

Therefore, we perform radial-angular coordinate transformation first. The rotation angle is linear in the radial-angular coordinate. However, the scale factor is still nonlinear in the radial-angular coordinate. This invention performs log-converted radial-angular transformation that is linear in both scale and rotation sampling.

III.2. Log-Converted Radial-Angular Transformation

The log-converted radial-angular coordinate transformation takes advantage of the relationship $\log(\theta r)=\log \theta +\log r$ to the radial-angular coordinate transformed domain. Therefore, the effect of the scale factor is an offset in the log-converted radial-angular coordinate system.

Considering the radial-angular (r, θ) coordinate system, where r denotes radial distance from the center ($x_c$, $y_c$) and θ denotes angle. Any (x,y) point can be represented in radial-angular coordinates (r, θ):

$$r = \sqrt{(x-x_c)^2 + (y-y_c)^2}$$

$$\theta = \tan^{-1}\left(\frac{y-y_c}{x-x_c}\right)$$

Let ρ=log r, the coordinate transformation between the Cartesian coordinate system and the log-converted radial-angular coordinate system is described by the following formula:

$x = \exp(\rho)\cos \theta$ $y = \exp(\rho)\sin \theta$

The area element is $dxdy = \exp(2\rho)d\rho d\theta = r^2 d\rho d\theta$.

Let the image $\Psi$ be the weighted transform image of the log-converted radial-angular coordinate as follows:

$$\Psi[\theta][\rho]=\exp(\rho)I[\theta][\rho].$$

In the transformed domain, the matching function for images $\Psi, \Phi$ can be defined as $$Mat(\Psi, \Phi) = \frac{COV(\Psi, \Phi)}{\sqrt{VAR(\Psi)VAR(\Phi)}}$$

Where $$COV(\Psi, \Phi) = \frac{1}{N}\sum_{\theta,\rho}\Psi[\theta][\rho]\Phi[\theta][\rho] - \left(\frac{1}{N}\sum_{\theta,\rho}\Psi[\theta][\rho]\right)\left(\frac{1}{N}\sum_{\theta,\rho}\Psi[\theta][\rho]\right)$$

$$VAR(\Psi) = \frac{1}{N}\sum_{\theta,\rho}\Psi[\theta][\rho]\Phi[\theta][\rho] - \left(\frac{1}{N}\sum_{\theta,\rho}\Psi[\theta][\rho]\right)\left(\frac{1}{N}\sum_{\theta,\rho}\Psi[\theta][\rho]\right)$$

Where $$N = \sum_{\theta,\rho} 1.$$

This matching function bears the same form as the shift invariant matching function. Therefore, the bilinear interpolation or other linear interpolation methods can be used for invariant high precision match.

III.3. Sub-Pixel and Sub-Sampling Shift, Rotation and Scale Invariant Matching

In this invention, sub-pixel and sub-sampling image interpolation are used for high precision shift, rotation and scale invariant matching. In the following we describe the method in two dimensional case. Those skilled in the art should recognize that this method is also applicable to higher dimensional case by adding more interpolation parameters for optimization.

In the two dimensional case, the shift, rotation and scale invariant matching is accomplished by interpolation using four parameters. Two of the parameters, $\alpha$ and $\beta$, are interpolation parameters for position shift (translation). The other two parameters, $\gamma$ and $\delta$, are interpolation parameters for fine rotation and scale values. The quad-linear interpolated images in log-converted radial-angular coordinate system is represented as $$\Psi[\theta][\rho] = (1-\alpha)(1-\beta)\{(1-\gamma)(1-\delta)\Psi_{00}[\theta][\rho] + \gamma(1-\delta)$$
$$\Psi_{00}[\theta+1][\rho] + \delta(1-\gamma)\Psi_{00}[\theta][\rho+1] + \delta\gamma\Psi_{00}[\theta+\alpha(1-$$
$$\beta)\{(1-\gamma)(1-\delta)\Psi_{10}[\theta][\rho] + \gamma(1-\delta)\Psi_{10}[\theta+1][\rho] + \delta(1-$$
$$\gamma)\Psi_{10}[\theta][\rho+1] + \delta\gamma\Psi_{10}[\theta+1][\rho+1]\} + \beta(1-\alpha)\{(1-$$
$$\gamma)(1-\delta)\Psi_{01}[\theta][\rho] + \gamma(1-\delta)\Psi_{01}[\theta+1][\rho] + \delta(1-$$
$$\gamma)\Psi_{01}[\theta][\rho+1] + \delta\gamma\Psi_{01}[\theta+1][\rho+1]\} + \alpha\beta\{(1-\gamma)(1-$$

-continued
$$\delta)\Psi_{11}[\theta][\rho] + \gamma(1-\delta)\Psi_{11}[\theta+1][\rho] + \delta(1-\gamma)\Psi_{11}[\theta][\rho+$$
$$1] + \delta\gamma\Psi_{11}[\theta+1][\rho+1]\}$$

Where $\Psi_{00}[\theta][\rho]$ is the weighted log-converted radial-angular coordinate transformed image of $(x_0, y_0)$. $\Psi_{10}[\theta][\rho]$ is the weighted log-converted radial-angular coordinate transformed image of $(x_0+1, y_0)$. $\Psi_{01}[\theta][\rho]$ is the weighted log-converted radial-angular coordinate transformed image of $(x_0, y_0+1)$, and $\Psi_{11}[\theta][\rho]$ is the weighted log-converted radial-angular coordinate transformed image of $(x_0+1, y_0+1)$.

Rewriting the above equation as $$\Psi[\theta][\rho] = \sum_{k=1}^{16} f_k(\alpha, \beta, \gamma, \delta)\Lambda_k[\theta][\rho]$$

Where
$f_1(\alpha,\beta,\gamma,\delta)=(1-\alpha)(1-\beta)(1-\gamma)$, $f_2(\alpha,\beta,\gamma,\delta)=(1-\alpha)(1-\beta)\gamma(1-\delta)$,
$f_3(\alpha,\beta,\gamma,\delta)=(1-\alpha)(1-\beta)(1-\delta)$, $f_4(\alpha,\beta,\gamma,\delta)=(1-\alpha)(1-\beta)\gamma\delta$,
$f_5(\alpha,\beta,\gamma,\delta)=\alpha(1-\beta)(1-\gamma)(1-\delta)$, $f_6(\alpha,\beta,\gamma,\delta)=\alpha(1-\beta)\gamma(1-\delta)$,
$f_7(\alpha,\beta,\gamma,\delta)=\alpha(1-\beta)(1-\gamma)\delta$, $f_8(\alpha,\beta,\gamma,\delta)=\alpha(1-\alpha)\beta\gamma(1-\delta)$,
$f_9(\alpha,\beta,\gamma,\delta)=(1-\alpha)\beta(1-\gamma)(1-\delta)$, $f_{10}(\alpha,\beta,\gamma,\delta)=(1-\alpha)\beta\gamma\delta$,
$f_{11}(\alpha,\beta,\gamma,\delta)=(1-\alpha)\beta(1-\gamma)\delta$, $f_{12}(\alpha,\beta,\gamma,\delta)=(1-\alpha)\beta\gamma\delta$,
$f_{13}(\alpha,\beta,\gamma,\delta)=\alpha\beta(1-\gamma)(1-\delta)$, $f_{14}(\alpha,\beta,\gamma,\delta)=\alpha\beta\gamma(1-\delta)$,
$f_{15}(\alpha,\beta,\gamma,\delta)=\alpha\beta(1-\gamma)\delta$, and $f_{16}(\alpha,\beta,\gamma,\delta)=\alpha\beta\gamma\delta$.

Also,
$\Lambda_1[\theta][\rho]=\Psi_{00}[\theta][\rho]$, $\Lambda_2[\theta][\rho]=\Psi_{00}[\theta+1][\rho]$,
$\Lambda_3[\theta][\rho]=\Psi_{00}[\theta][\rho+1]$, $\Lambda_4[\theta][\rho]=\Psi_{00}[\theta+1][\rho+1]$,
$\Lambda_5[\theta][\rho]=\Psi_{10}[\theta][\rho]$, $\Lambda_6[\theta][\rho]=\Psi_{10}[\theta+1][\rho]$,
$\Lambda_7[\theta][\rho]=\Psi_{10}[\theta][\rho+1]$, $\Lambda_8[\theta][\rho]=\Psi_{10}[\theta+1][\rho+1]$,
$\Lambda_9[\theta][\rho]=\Psi_{01}[\theta][\rho]$, $\Lambda_{10}[\theta][\rho]=\Psi_{01}[\theta+1][\rho]$,
$\Lambda_{11}[\theta][\rho]=\Psi_{01}[\theta][\rho+1]$, $\Lambda_{12}[\theta][\rho]=\Psi_{01}[\theta+1][\rho+1]$,
$\Lambda_{13}[\theta][\rho]=\Psi_{11}[\theta][\rho]$, $\Lambda_{14}[\theta][\rho]=\Psi_{11}[\theta+1][\rho]$,
$\Lambda_{15}[\theta][\rho]=\Psi_{11}[\theta][\rho+1]$, and $\Lambda_{16}[\theta][\rho]=\Psi_{11}[\theta+1][\rho+1]$.

The covariance of $\Psi, \Phi$ is therefore $$COV(\Psi, \Phi) = \sum_{k=1}^{16} f_k(\alpha, \beta, \gamma, \delta)COV(\Lambda_k, \Phi)$$

and the variance of $\Psi$ is $$VAR(\Psi) = \sum_{k=1}^{16}[f_k(\alpha, \beta, \gamma, \delta)]^2 VAR(\Lambda_k) + 2\sum_{k>m}^{16} f_k(\alpha, \beta, \gamma, \delta)f_m(\alpha, \beta, \gamma, \delta)COV(\Lambda_k, \Lambda_m)$$

The matching score between $\Psi, \Phi$ as a function of the high precision interpolation parameters is $$Mat(\Psi, \Phi; \alpha, \beta, \gamma, \delta) = \frac{COV(\Psi, \Phi)}{\sqrt{VAR(\Psi)VAR(\Phi)}}$$

The best subpixel and subsampling matching can be determined by finding parameters α, β, γ, δ and a that correspond to the maximum value of the MatΨ(Φ;α,β,γ,δ). The parameters are the invariant high precision match result. This is an optimization problem similar to the above non-invariant high precision match. Many optimization methods can be used for determining the four parameters. Typical methods include random optimization (RO), bi-directional RO (BRO), improved BRO (IBRO), gradient method, alternative gradient method, and golden section method, etc.

In one embodiment of the invention, the method to find α, β, γ, and δ is described as follows.

Rewriting the COV(Ψ,Φ) and VAR(Ψ) as $$COV(\Psi,\Phi) = \vec{u}^T \vec{f}$$

and $$VAR(\Psi) = \vec{f}^T \Omega \vec{f}$$

where $\vec{f} = [f_1, f_2, f_{16}]^T$, $\vec{u} = [COV(\Lambda_1,\Phi), COV(\Lambda_2,\Phi), \ldots, COV(\Lambda_{16},\Phi)]^T$, and $$\Omega = \begin{bmatrix} COV(\Lambda_1,\Lambda_1) & COV(\Lambda_1,\Lambda_2) & \cdots & COV(\Lambda_1,\Lambda_{16}) \\ COV(\Lambda_2,\Lambda_1) & COV(\Lambda_2,\Lambda_2) & \cdots & COV(\Lambda_2,\Lambda_{16}) \\ \cdots & \cdots & \cdots & \cdots \\ COV(\Lambda_{16},\Lambda_1) & COV(\Lambda_{16},\Lambda_2) & \cdots & COV(\Lambda_{16},\Lambda_{16}) \end{bmatrix}$$

Given β, γ, and δ, the value a for the optimum matching function is $$\alpha = -\frac{(\vec{u}^T \vec{g}_\alpha)(\vec{g}_\alpha^T \Omega \vec{f}_\alpha) - (\vec{u}^T \vec{f}_\alpha)(\vec{g}_\alpha^T \Omega \vec{g}_\alpha)}{(\vec{u}^T \vec{g}_\alpha)(\vec{f}_\alpha^T \Omega \vec{f}_\alpha) - (\vec{u}^T \vec{f}_\alpha)(\vec{g}_\alpha^T \Omega \vec{f}_\alpha)}$$

Similarly, for given α, γ and δ, the value β for the optimum matching function is $$\beta = -\frac{(\vec{u}^T \vec{g}_\beta)(\vec{g}_\beta^T \Omega \vec{f}_\beta) - (\vec{u}^T \vec{f}_\beta)(\vec{g}_\beta^T \Omega \vec{g}_\beta)}{(\vec{u}^T \vec{g}_\beta)(\vec{f}_\beta^T \Omega \vec{f}_\beta) - (\vec{u}^T \vec{f}_\beta)(\vec{g}_\beta^T \Omega \vec{f}_\beta)}$$

For given α, β, and γ, the value δ for the optimum matching function is $$\gamma = -\frac{(\vec{u}^T \vec{g}_\gamma)(\vec{g}_\gamma^T \Omega \vec{f}_\gamma) - (\vec{u}^T \vec{f}_\gamma)(\vec{g}_\gamma^T \Omega \vec{g}_\gamma)}{(\vec{u}^T \vec{g}_\gamma)(\vec{f}_\gamma^T \Omega \vec{f}_\gamma) - (\vec{u}^T \vec{f}_\gamma)(\vec{g}_\gamma^T \Omega \vec{f}_\gamma)}$$

For given α, β, and γ, the value δ for the optimum matching function is $$\delta = -\frac{(\vec{u}^T \vec{g}_\delta)(\vec{g}_\delta^T \Omega \vec{f}_\delta) - (\vec{u}^T \vec{f}_\delta)(\vec{g}_\delta^T \Omega \vec{g}_\delta)}{(\vec{u}^T \vec{g}_\delta)(\vec{f}_\delta^T \Omega \vec{f}_\delta) - (\vec{u}^T \vec{f}_\delta)(\vec{g}_\delta^T \Omega \vec{f}_\delta)}$$

-continued

Where $$\vec{f}_\alpha = \begin{bmatrix} -(1-\beta)(1-\gamma)(1-\delta) \\ -(1-\beta)\gamma(1-\delta) \\ -(1-\beta)(1-\gamma)\delta \\ -(1-\beta)\gamma\delta \\ (1-\beta)(1-\gamma)(1-\delta) \\ (1-\beta)\gamma(1-\delta) \\ (1-\beta)(1-\gamma)\delta \\ (1-\beta)\gamma\delta \\ -\beta(1-\gamma)(1-\delta) \\ -\beta\gamma(1-\delta) \\ -\beta(1-\gamma)\delta \\ -\beta\gamma\delta \\ \beta(1-\gamma)(1-\delta) \\ \beta\gamma(1-\delta) \\ \beta(1-\gamma)\delta \\ \beta\gamma\delta \end{bmatrix}, \quad \vec{g}_\alpha = \begin{bmatrix} (1-\beta)(1-\gamma)(1-\delta) \\ (1-\beta)\gamma(1-\delta) \\ (1-\beta)(1-\gamma)\delta \\ (1-\beta)\gamma\delta \\ 0 \\ 0 \\ 0 \\ 0 \\ \beta(1-\gamma)(1-\delta) \\ \beta\gamma(1-\delta) \\ \beta(1-\gamma)\delta \\ \beta\gamma\delta \\ 0 \\ 0 \\ 0 \\ 0 \end{bmatrix}$$

$$\vec{f}_\beta = \begin{bmatrix} -(1-\alpha)(1-\gamma)(1-\delta) \\ -(1-\alpha)\gamma(1-\delta) \\ -(1-\alpha)(1-\gamma)\delta \\ -(1-\alpha)\gamma\delta \\ -\alpha(1-\gamma)(1-\delta) \\ -\alpha\gamma(1-\delta) \\ -\alpha(1-\gamma)\delta \\ -\alpha\gamma\delta \\ (1-\alpha)(1-\gamma)(1-\delta) \\ (1-\alpha)\gamma(1-\delta) \\ (1-\alpha)(1-\gamma)\delta \\ (1-\alpha)\gamma\delta \\ \alpha(1-\gamma)(1-\delta) \\ \alpha\gamma(1-\delta) \\ \alpha(1-\gamma)\delta \\ \alpha\gamma\delta \end{bmatrix}, \quad \vec{g}_\beta = \begin{bmatrix} (1-\alpha)(1-\gamma)(1-\delta) \\ (1-\alpha)\gamma(1-\delta) \\ (1-\alpha)(1-\gamma)\delta \\ (1-\alpha)\gamma\delta \\ \alpha(1-\gamma)(1-\delta) \\ \alpha\gamma(1-\delta) \\ \alpha(1-\gamma)\delta \\ \alpha\gamma\delta \\ 0 \\ 0 \\ 0 \\ 0 \\ 0 \\ 0 \\ 0 \\ 0 \end{bmatrix}$$

$$\vec{f}_\gamma = \begin{bmatrix} -(1-\alpha)(1-\beta)(1-\delta) \\ (1-\alpha)(1-\beta)(1-\delta) \\ -(1-\alpha)(1-\beta)\delta \\ (1-\alpha)(1-\beta)\delta \\ -\alpha(1-\beta)(1-\delta) \\ \alpha(1-\beta)\gamma(1-\delta) \\ -\alpha(1-\beta)\delta \\ \alpha(1-\beta)\delta \\ -(1-\alpha)\beta(1-\delta) \\ (1-\alpha)\beta(1-\delta) \\ -(1-\alpha)\beta\delta \\ (1-\alpha)\beta\delta \\ -\alpha\beta(1-\delta) \\ \alpha\beta(1-\delta) \\ -\alpha\beta\delta \\ \alpha\beta\delta \end{bmatrix}, \quad \vec{g}_\gamma = \begin{bmatrix} (1-\alpha)(1-\beta)(1-\delta) \\ 0 \\ (1-\alpha)(1-\beta)\delta \\ 0 \\ \alpha(1-\beta)(1-\delta) \\ 0 \\ \alpha(1-\beta)\delta \\ 0 \\ (1-\alpha)\beta(1-\delta) \\ 0 \\ (1-\alpha)\beta\delta \\ 0 \\ \alpha\beta(1-\delta) \\ 0 \\ \alpha\beta\delta \\ 0 \end{bmatrix}$$

$$\vec{f}_\delta = \begin{bmatrix} -(1-\alpha)(1-\beta)(1-\gamma) \\ -(1-\alpha)(1-\beta)\gamma \\ (1-\alpha)(1-\beta)(1-\gamma) \\ (1-\alpha)(1-\beta)\gamma \\ -\alpha(1-\beta)(1-\gamma) \\ -\alpha(1-\beta)\gamma \\ \alpha(1-\beta)(1-\gamma) \\ \alpha(1-\beta)\gamma \\ -(1-\alpha)\beta(1-\gamma) \\ -(1-\alpha)\beta\gamma \\ (1-\alpha)\beta(1-\gamma) \\ (1-\alpha)\beta\gamma \\ -\alpha\beta(1-\gamma) \\ -\alpha\beta\gamma \\ \alpha\beta(1-\gamma) \\ \alpha\beta\gamma \end{bmatrix}, \quad \vec{g}_\delta = \begin{bmatrix} (1-\alpha)(1-\beta)(1-\gamma) \\ (1-\alpha)(1-\beta)\gamma \\ 0 \\ 0 \\ \alpha(1-\beta)(1-\gamma) \\ \alpha(1-\beta)\gamma \\ 0 \\ 0 \\ (1-\alpha)\beta(1-\gamma) \\ (1-\alpha)\beta\gamma \\ 0 \\ 0 \\ \alpha\beta(1-\gamma) \\ \alpha\beta\gamma \\ 0 \\ 0 \end{bmatrix}$$

Figure 6:
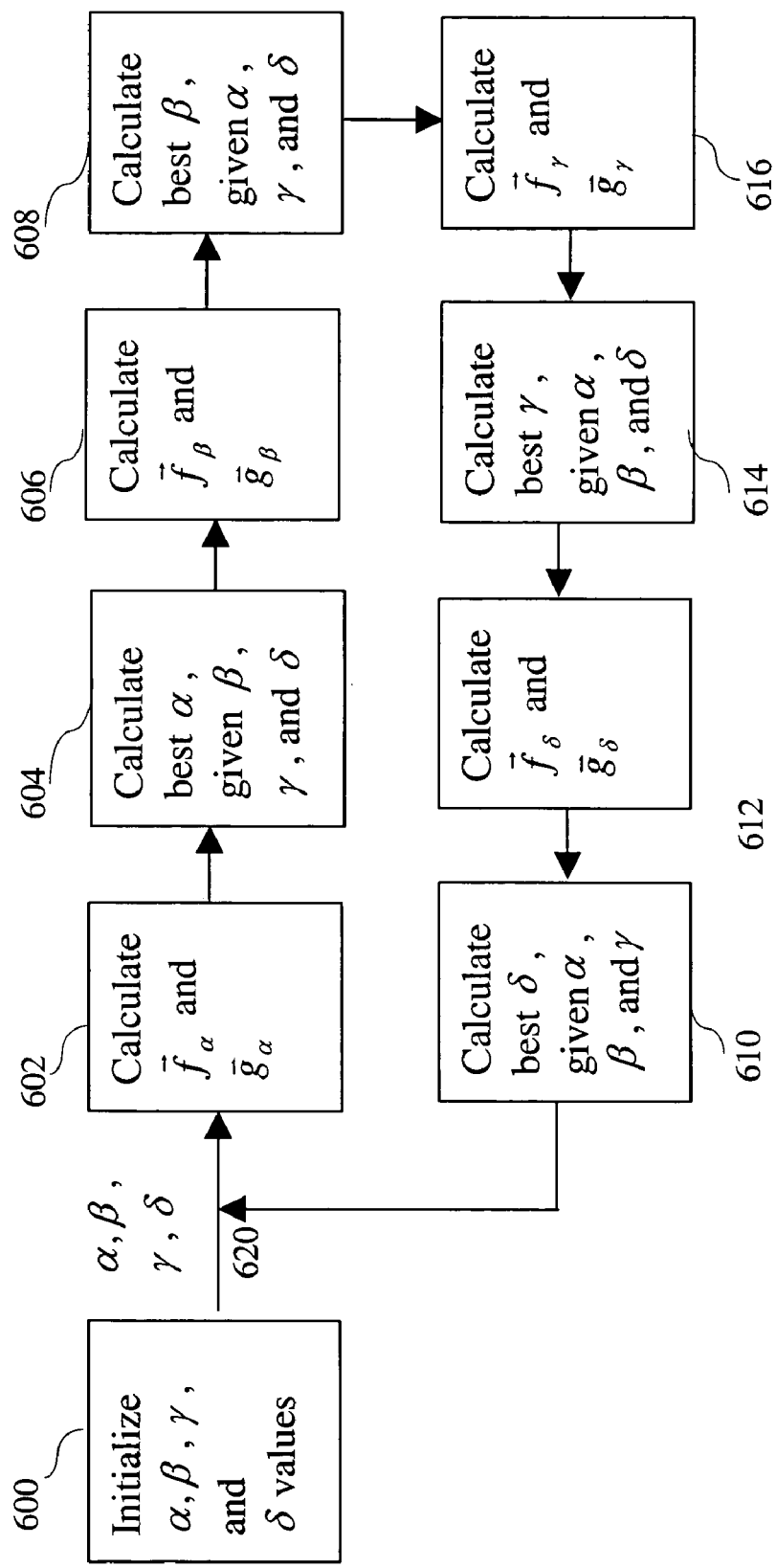
FIG. 6 shows A matching function maximization method that finds the best $\alpha$, $\beta$, $\gamma$, and $\delta$ values.

In one embodiment of the invention, the matching function maximization method that finds $\alpha$, $\beta$, $\gamma$, and $\delta$ is performed by an iterative procedure as shown in FIG. 6.

As shown in FIG. 6, the $\alpha$, $\beta$, $\gamma$, and $\delta$ values are initialized 600 to initial values. The values could be randomly selected between the valid ranges or could be set to the middle of ranges or to expected values from initial search, etc. Using the initial parameters values, $\vec{f}_\alpha$ and $\vec{g}_\alpha$ are calculated 602. This allows the calculation of the best $\alpha$ value given the $\alpha$, $\gamma$, and $\delta$ values 604. The best $\alpha$ value is used along with the initial $\gamma$ and $\delta$ values to calculate the $\vec{f}_\beta$ and $\vec{g}_\beta$ values 606. This allows the calculation of the best $\beta$ value given $\alpha$, $\gamma$, and $\delta$ values 608. This process continues to calculate the best $\gamma$ and $\delta$ values, 616, 614, 612, 610. The calculated $\alpha$, $\beta$, $\gamma$, and $\delta$ values 620 are used to repeat the estimation calculation. This process is iterated until the $\alpha$, $\beta$, $\gamma$, and $\delta$ values are stable (having little change per iteration) or an exit condition such as the maximum number of iterations is reached. The resulting $\alpha$, $\beta$, $\gamma$, and $\delta$ values are the optimal subpixel and subsampling values.

Those skilled in the art should recognize that other methods of optimization could be applied to determine the optimal subpixel and subsampling values.

When $\Psi$ is the template image and the $\Phi$ is the input image, the terms in VAR($\Psi$) can be pre-calculated from the template. Only the terms of COV($\Psi,\Phi$) have to be calculated for each input image regions of interest. This will speed up the invariant high precision match process.

III.3. Robust Matching

The robust matching method described in section II.6 for non-invariant high precision match can be similarly applied for invariant high precision match. The robust matching methods include limiting pixel contribution and pixel weighting.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A fast high precision matching method comprising the steps of:
   a) Input an image;
   b) Input a template;
   c) Perform initial search using the input image and the template based on a matching function to create an initial search result output containing only matching function values at discrete (x,y) positions;
   d) Create high precision matching function by interpolating the matching function values of discrete (x,y) positions making them matching function values of subpixel positions or of invariant high precision parameters;
   e) Perform high precision match by high precision matching function maximization directly using the matching function values at discrete (x,y) positions from the step (c), the input image, and the same template from step (b) to create a high precision match result output without image matching wherein the high precision match result output around a pixel position (x,y) is the subpixel values $\alpha$ and $\beta$ and other parameters correspond to the maximum value of the high precision matching function.

2. The method of claim 1 wherein the matching function maximization for the subpixel values or invariant high precision parameters is performed using optimization methods.

3. A fast high precision matching method comprising the steps of:
   a) Input an image;
   b) Input a template containing pre-calculated template variance parameters;
   c) Perform initial search using the input image and the template based on a matching function to create an initial search result output containing only matching function values at discrete (x,y) position;
   d) Create high precision matching function by interpolating the matching function values of discrete (x,y) positions making them matching function values of subpixel positions of invariant high precision parameters;
   e) Perform high precision match by high precision matching function maximization directly using the matching function values at discrete (x,y) positions from step (c), the input image, and the same template from step (b) to create a high precision match result output without image matching wherein the high precision match result output around a pixel position (x,y) is the subpixel values $\alpha$ and $\beta$ and other parameters correspond to the maximum value of the high precision matching function.

4. A fast high precision projection matching method comprising the steps of:
   a) Input a projection profile;
   b) Input a template profile;
   c) Create high precision matching function by interpolating matching function values at discrete (x,y) positions and samples parameters making them matching function values of subpixel positions or of subsampling parameters;
   d) Perform high precision match by high precision matching function maximization using the projection profile, the same template profile from step (b) to create a high precision projection match result output Perform high precision match by high precision matching function maximization directly using the matching function values at discrete (x,y) positions from step (c), the input image, and the same template from step (b) to create a high precision match result output without image matching wherein the high precision match result output around a pixel position (x,y) is the subpixel values $\alpha$ and $\beta$ and other parameters correspond to the maximum value of the high precision matching function.

5. A fast invariant high precision matching method comprising the steps of:
   a) Input an image;
   b) Input a template;
   c) Perform initial search using the input image and the template based on a matching function to create an initial search result output containing only matching function values at discrete (x,y) position;
   d) Create high precision matching function by interpolating the matching function values of discrete (x,y) positions making them matching function values of subpixel positions or of invariant high precision parameters;
   e) Perform invariant high precision match by high precision matching function maximization directly using the matching function values at discrete (x,y) positions from step (c), the input image, and the same template from step (b) to create an invariant high precision match result output without image matching wherein the high precision match result output around a pixel position (x,y) is the subpixel values $\alpha$ and $\beta$ and other parameters correspond to the maximum value of the high precision matching function.

6. The method of claim 5 wherein interpolating the matching function includes log-converted radial-angular transformation and linear interpolation.

* * * * *